C. P. TOWNSEND.
EAR CORN HOLDER.
APPLICATION FILED DEC. 16, 1908.

933,402.  Patented Sept. 7, 1909.

Witnesses
J. C. Simpson
F. O. ...

Inventor
Charles P. Townsend.

By Chandler & Chandler
Attorneys

ANDREW. B. GRAHAM CO., PHOTO-LITHOGRAPHERS, WASHINGTON, D. C.

UNITED STATES PATENT OFFICE.

CHARLES P. TOWNSEND, OF LIGHT STREET, PENNSYLVANIA.

EAR-CORN HOLDER.

933,402. Specification of Letters Patent. Patented Sept. 7, 1909.

Application filed December 16, 1908. Serial No. 467,841.

*To all whom it may concern:*

Be it known that I, CHARLES P. TOWNSEND, a citizen of the United States, residing at Light Street, in the county of Columbia, State of Pennsylvania, have invented certain new and useful Improvements in Ear-Corn Holders; and I do hereby declare the following to be a full, clear, and exact description of the invention, such as will enable others skilled in the art to which it appertains to make and use the same.

The invention relates to ear corn holders and more particularly to the class of devices adapted to be inserted in the opposite ends of ears of corn for supporting the same so that they can be easily handled when in the act of being eaten by a person.

The primary object of the invention is the provision of a device for holding ears of corn which comprise holders each formed o: a single piece of wire bent to produce a handle and spaced parallel prongs which latter are adapted to be inserted in the ends of an ear of corn, and a finger piece overlying the handle portion to enable the holder to be conveniently gripped so that the ear of corn can be easily handled without touching the same by the hands of a person, and furthermore, to enable the ear of corn to be rotate for the purpose of applying condiments.

Another object of the invention is the provision of ear corn holders which are simple in construction, efficient in operation and inexpensive in the manufacture.

With these and other objects in view the invention consists in the construction, combination and arrangement of parts as will be hereinafter more fully described, illustrated in the accompanying drawings which disclose the preferred form of embodiment of the invention and as brought out in the appended claims.

It is to be understood that changes, variations and modifications may be made such as come properly within the scope of the appended claims without departing from the spirit of the invention.

Figure 1:
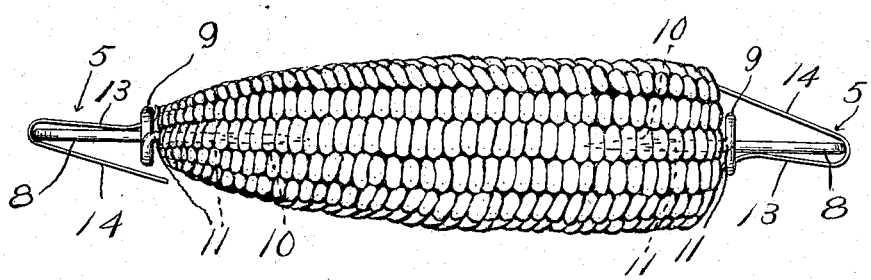
Figure 2:
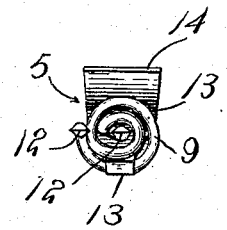
Figure 3:
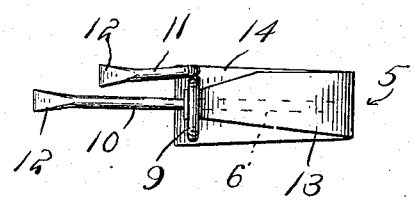
Figure 4:
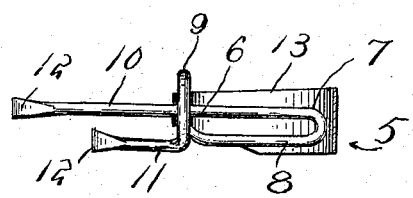

In the drawings: Figure 1 is a side elevation of an ear of corn with the invention applied thereto. Fig. 2 is an end view of one of the holders removed from the ear of corn. Fig. 3 is a bottom view thereof. Fig. 4 is a top plan view partly in section.

Similar reference characters indicate corresponding parts throughout the several views in the drawings.

In the drawings, the numeral 5 designates generally each of the holders both of which are adapted to be mounted at opposite ends of an ear of corn so that the same can be conveniently and easily handled by a person without requiring to be clutched by the hand. Each holder comprises a single strand of wire 6 the same being relatively stiff and bent outwardly and inwardly as at 7 to form a handle portion 8 and which wire is further bent or coiled as at 9 about a straight shank portion 10 thereof and terminating in a spaced short prong 11 in parallelism with the straight shank 10 and of less length than the latter. The free ends of the said shank and prong are flattened to form beveled pointed extremities 12 which latter are adapted to be inserted into the body of an ear of corn and the extent of the insertion of the same is limited by the coiled portion 9 forming a stop.

Secured to the coiled portion 9 is one end of a flat finger piece 13 which latter is bent about the handle portion 8 and has its free end terminating in a flexible wing 14 and this finger piece is adapted to be gripped by a person when it is desired to insert the holder into the end of the ear of corn and to enable the latter to be conveniently and easily handled or lifted to the mouth.

It is obvious that when the shank and prong of the holder engage in the end of an ear of corn the said holder is prevented from turning therein or in other words twisting when the ear of corn is being rotated so that condiments can be applied thereto. Furthermore due to the fact that the shank 10 is of greater length than the prong 11 it will enable the holder to be more easily inserted in the end of an ear of corn.

What is claimed is—

1. A device of the class described comprising a holder formed of a single wire bent to form a handle terminating in a straight shank and a prong of less length with respect to the shank, said wire further bent to form a coiled portion producing a stop between the handle and the ends of the shank and prong.

2. A device of the class described comprising a holder formed of a single wire bent to form a handle terminating in a straight shank and a prong of less length with respect to the shank, said wire further bent to form a coiled portion producing a stop between the handle and the ends of the shank and prong, and a finger piece disposed about the handle of the holder.

In testimony whereof, I affix my signature, in presence of two witnesses.

CHARLES P. TOWNSEND.

Witnesses:
TILLIE REIGHARD,
REBECCA C. ENT.